United States Patent [19]

Oberlander

[11] Patent Number: 5,509,000
[45] Date of Patent: Apr. 16, 1996

[54] METHOD AND APPARATUS FOR ROUTING INFORMATION IN A COMMUNICATION SYSTEM

[75] Inventor: Lewis B. Oberlander, Buffalo Grove, Ill.

[73] Assignee: Motorola, Inc., Schaumburg, Ill.

[21] Appl. No.: 257,842

[22] Filed: Jun. 10, 1994

[51] Int. Cl.⁶ .............................. H04L 9/00; H04L 12/16
[52] U.S. Cl. .................. 370/17; 370/54; 370/62; 370/110.1; 379/93; 379/211
[58] Field of Search .................. 370/13, 17, 54, 370/60, 60.1, 61, 62, 94.1, 94.2, 110.1; 379/93, 94, 95, 211, 220, 221

[56] References Cited

U.S. PATENT DOCUMENTS

| | | | |
|---|---|---|---|
| 5,341,366 | 8/1994 | Soumiya et al. | 370/17 |
| 5,406,557 | 4/1995 | Baudoin | 370/61 |
| 5,414,698 | 5/1995 | Adams | 370/17 |

Primary Examiner—Melvin Marcelo
Attorney, Agent, or Firm—Val Jean Hillman; Kevin A. Buford

[57] ABSTRACT

A method and apparatus for routing information within a communication system (100) is based upon evaluating various attributes (310) of the information to be routed. The methodology employs processing steps including, but not limited to receiving a message (300) having a key (304) and a first set of message attributes (310), each attribute having a value. Extracting the key (304) from the message to index a data base (400) in order to retrieve records (410) having the key and containing a representation of a logic function (406) that describes a second set of message attributes. The first set of attributes values are applied to the logic function (406) of the first retrieved record to determine whether the function is true or false. If true, that data base record is selected for use in routing the information. Otherwise, the first set of attribute values are applied to the logic functions of each indexed data base record (410) until a true condition is encountered. This methodology is employed with the selection of a destination device as well as the selection of a communication network.

29 Claims, 5 Drawing Sheets

100

200

300

*400*

*500*

505

700

700

710

720

METHOD AND APPARATUS FOR ROUTING INFORMATION IN A COMMUNICATION SYSTEM

FIELD OF THE INVENTION

The present invention pertains generally to communication systems and particularly to a method and apparatus for routing information to a particular person (i.e., subscriber) via a particular destination device and over a particular network within a communication system.

BACKGROUND OF THE INVENTION

In today's fast paced business environment, individuals on-the-move, often need to receive information, such as, but not limited to voice messages and/or electronic files, documents and/or messages, be they multimedia or otherwise, said information being transmitted from a remote location and destined for the mobile individual. For their data communicating needs, these individuals may employ a plethora of communicating devices such as, for example, pagers, radio telephones, personal computers, personal digital assistants (PDAs) and the like. Each of these above devices is typically optimized to carry a specific type or format of data over a particular type of communication network.

Notwithstanding these limitations, the typical business individual may nonetheless prefer to receive a particular type of information at a particular one of her communicating devices. For example, she may desire to receive all electronic mail messages (i.e., E-Mail) at her desktop personal computer when she is in the office. When at home or traveling, however, she may prefer to receive all E-Mail messages at her notebook personal computer. Depending upon the urgency of the information, the recipient may prefer to receive the information immediately or instead have it routed to a colleague. As an alternative, low priority information may be sent to yet another destination device for storage and later retrieval. Where the information is routable to the recipient via more than one communication network, issues relating to cost, security, transmit time, etc., may be taken into consideration.

Unfortunately, the party seeking to transmit the information typically has no idea of the recipient's location or of the recipient's communication preferences, such as, for example, where she desires E-Mail messages to be delivered. It would be extremely advantageous therefore to provide a method and apparatus for routing information within a communication system which takes into consideration subscriber specified preferences.

DETAILED DESCRIPTION OF A PREFERRED EMBODIMENT

The purpose of the information routing scheme of the present invention is to permit a communication system subscriber to selectively operate a plurality of different communication devices, each at different times, or to use said plurality of different communication devices simultaneously and for different tasks, according to the subscriber's preference. In addition, for reasons of cost, security, urgency or efficiency, it permits the selection of one of a plurality of potential communication networks for use in transporting said information to the selected subscriber device.

Figure 1:
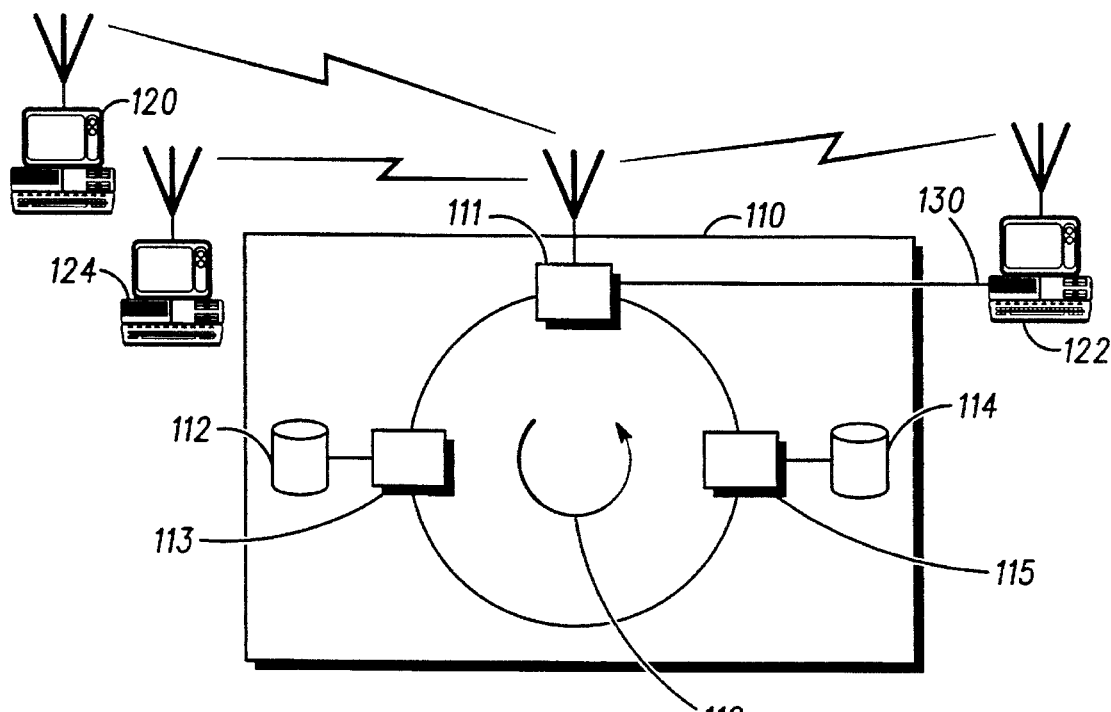
FIG. 1 illustrates in block diagram form a communication system anticipated by the present invention.

For the purpose of discussion, and not for the purpose of limitation, FIG. 1 illustrates in block diagram form a communication system 100 that may be used by the present invention. As depicted, the communication system 100 employs both wireless and wireline communication networks comprising a server 110 and a plurality of subscriber devices 120–124.

For the purpose of clarity, a system subscriber or subscriber as used herein, shall refer to any individual who employs one or more devices 120–124 wherein each device is capable of communicating over one or more of the communication networks within the communication system 100.

As depicted, devices 120 and 124 communicate with server 110 via a wireless communication media such as, but not limited to radio frequency (RF) and/or Infrared (IR) communication channels. In accordance with the preferred embodiment, the present invention anticipates both RF and IR communications as wireless carriers of choice. In addition, the present invention anticipates that more than one RF communication network may be available for the transmission of information. Device 122 communicates with server 110 over a wireline communication network via connection 130 as well as via a wireless network as mentioned above. In accordance with the preferred embodiment, the present invention anticipates that any wireline based communication technique may be utilized to provide the wireline communication connection 130.

By way of example and not by way of limitation, device 122 may communicate with server 100 via the Public Switch Telephone Network (PSTN), a Local Area Network (LAN) such as Ethernet, a Token Ring network, an Integrated Service Digital Network (ISDN) or any of a plurality of other public or private networks employing protocols such as, for example, an RS232 format or any other data format suitable for providing data packet communication.

Shown within server 110 is a partial data flow diagram 119 depicting some of the steps performed by server 110 upon receipt of an incoming information message from, for example, device 120. In particular, data flow diagram 119 shows various linked work sessions 111, 113 and 115 which each operate upon the received message prior to delivery to the appropriate destination device. Work session 111 is a communication manager (CM), work session 113 is a device mobility manager (DMM) and work session 115 is a network mobility manager (NMM).

In accordance with the preferred embodiment, CM 111 is a software program (i.e., process) that controls all communication resources allocated to server 110. Thus, all messages entering and exiting server 110 must necessarily pass through CM 111. DMM 113 is a software program that operates to select a destination device address to be appended to the received message. In a similar fashion, NMM 115 is a software program that receives the message from DMM 113 and selects one of a plurality of communication networks for transmission of the message. To assist in this effort, DMM 113 maintains a DMM data base 112 while NMM 115 maintains a NMM data base 114 as described herein below in more detail.

As will be appreciated by those skilled in the art, other linked work sessions may be employed by server 110. Moreover, rather than existing as stand alone software programs, each session 111, 113 and 115 may comprise a subroutine of a larger software program or may be implemented in hardware logic.

Figure 2:
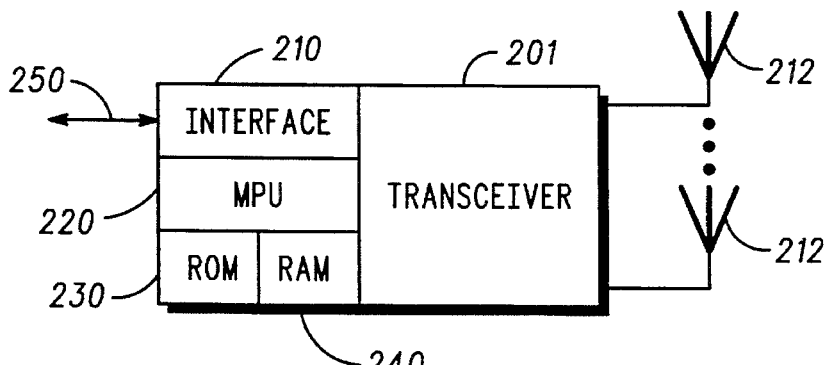
FIG. 2 is a block diagram representation of a structure common to the subscriber devices of FIG. 1.

FIG. 2 illustrates a block diagram of a structure 200 common to server 110 and devices 120–124 of FIG. 1. A wireless transceiver 201 utilizes digital data to modulate a carrier signal to transmit the desired data and its receiver converts received RF signals into corresponding digital data. In accordance with the present invention, transceiver 201 is an RF transceiver. Notwithstanding, it may comprise any other well known wireless communication technology such as, but not limited to infrared (IR) technologies.

Transceiver 201 employs one or more antennas designated 212 for communicating with server 110 as shown in FIG. 1. A processing unit 220, such as, for example, a microprocessor, operates under the control of an operating system contained in read only memory 230 and utilizes random access memory 240 to control inbound and outbound data traffic carried by path 250 and transceiver 200. An interface 210 may consist of line drivers and input/output buffers and registers as is conventional in processor based systems. The path 250 corresponds to the wireline communication channel 130 of FIG. 1 between server 110 and a device 120. The processing unit 220 operation relating to message routing is explained in more detail below.

Figure 3:
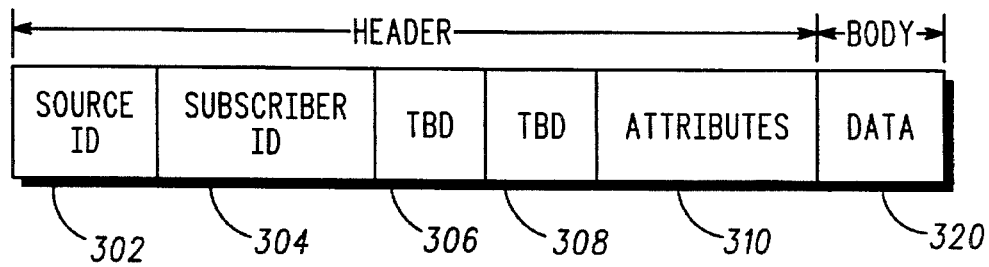
FIG. 3 depicts the structure of a message for use within the communication system of FIG. 1.

FIG. 3 depicts the structure of a message 300 for use within the communication system of FIG. 1. As depicted each message comprises a header portion and a body. The header portion of a message 300 consists of a Source ID field 302, Subscriber ID field 304, Null fields 306 and 308, and Attributes field 310. The body of message 300 comprises data field 320 which contains the information to be communicated.

Source ID field 302 contains information identifying a device 120 that originated the message, subscriber ID field 304 contains information which identifies to server 110 the subscriber (i.e., individual) to whom the message is intended. Null field 306 is a field which shall be filled by server 110 with the address of a destination device which is to receive the data portion of the message in question. Null field 308 is a field which shall be filled by server 110 with a list of network ID's identifying those communication networks which may be used to communicate the message in question to the selected destination device. Attributes field 310 maintains information specific to the message 300 in question and may include information such as, but is not limited to message originator, message priority, message data format, message logical size, message security requirements, message transmitted size, and message compressed size. Each attribute as identified within field 310 will have associated therewith a corresponding value. For example, the value for the message attribute, message logical size, may be 1024 bytes (i.e., 1K byte), thereby indicating the logical size of the message in question.

Figure 4:
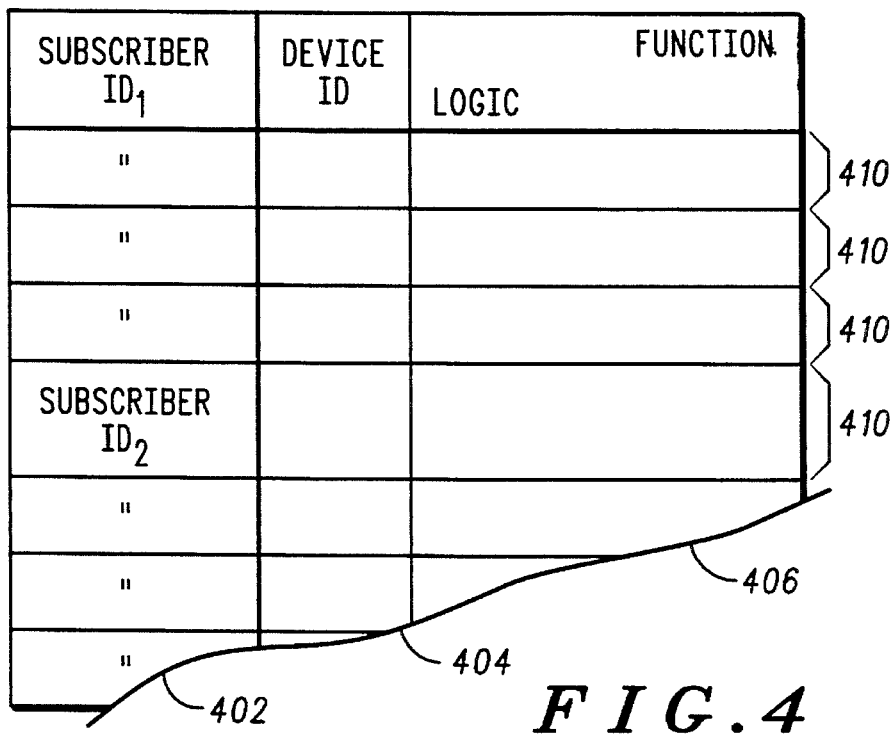
FIG. 4 depicts an embodiment of a data base structure as anticipated by the present invention.

FIG. 4 depicts an embodiment of a data base structure as anticipated by the present invention. The structure of FIG. 4 is employed by data base 112 of FIG. 1 and used by DMM 113 in order to select a destination device for receipt of the message in question. The structure comprises a plurality of records 410, each record comprises a subscriber ID field 402, a device ID field 404 and a logic function field 406.

In practice, each record 410 represents a rule that conditionally maps a subscriber to one of his communicating devices 120–124. Each rule equates to a communication preference that is typically selected by the subscriber for whom the message is intended. In accordance with this embodiment subscriber ID field 402 contains a subscriber ID that identifies the individual to whom the message is intended. For each subscriber ID there is typically associated therewith one or more records 410, each record identifying a device 120–124 and its conditioning logic function.

When a message 300 arrives at server 110, the server will extract the subscriber ID from the header of message 300 and index data base 400 using the extracted subscriber ID as a key in order to determine which device to route the message to. This is accomplished by applying the set of attribute 310 values from the message in question to the logic function within field 406 of a first retrieved data base 400 record 410 as indexed by the key. When the outcome of such an evaluation is true, the device ID within device ID field 404 is written to Null field 306 of the header of the message in question.

Figure 5:
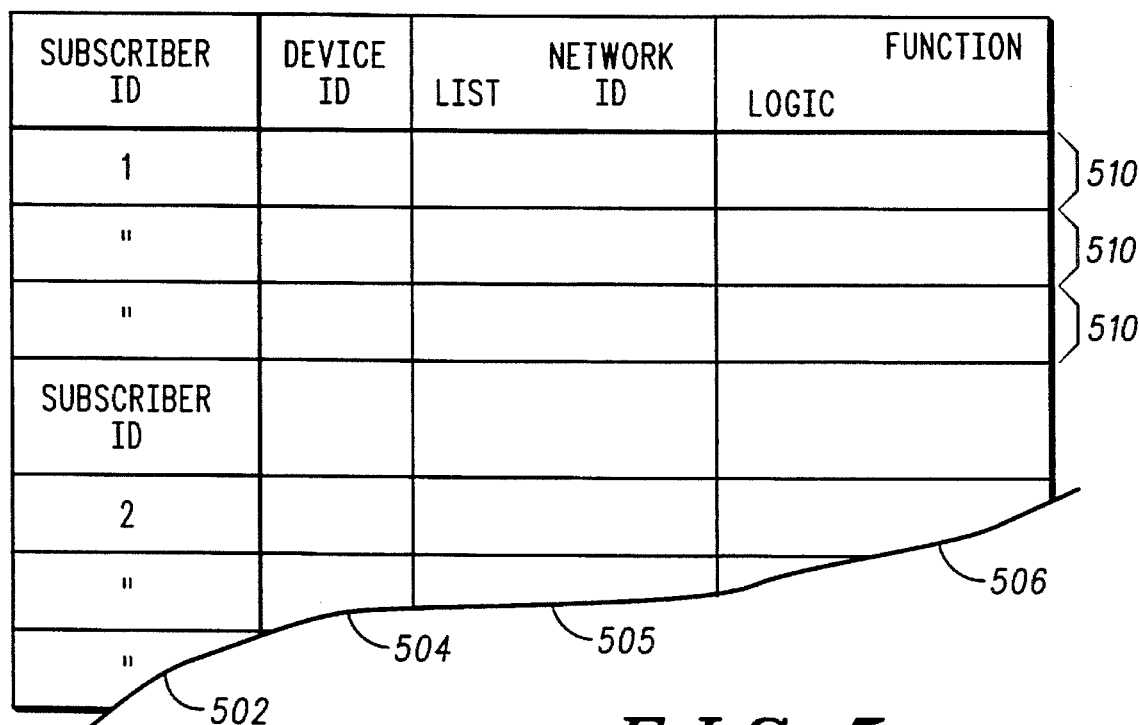
FIG. 5 depicts another embodiment of a data base as anticipated by the present invention.

FIG. 5 depicts an embodiment of a data base structure as anticipated by the present invention. The structure of FIG. 5 is employed by data base 114 of FIG. 1 and used by NMM 115 in order to select a communication network for transmission of the message in question. The structure comprises a plurality of records 510, each record comprises a subscriber ID field 502, a device ID field 504, a network ID list field 505 and a logic function field 506. In practice, each record 510 represents a rule that conditionally maps a subscriber and a selected device 120–124 to a prioritized list of communication networks. Each rule equates to a communication preference that is typically selected by the subscriber for whom the message is intended.

In accordance with this embodiment ,the subscriber ID field 502 and the device ID field 504 are used collectively as a key to index into data base 500. The key is generated as an output of the selection process that selects a destination device pursuant to the discussion of FIG. 4 and as described in greater detail herein below. For each key (subscriber ID 502 and Device ID 504) there may in association therewith, be one or more records 510, each record identifying a prioritized list of communication networks as set forth in field 505 and its conditioning logic function 506.

When a key, as generated by DMM session 113 of server 110, is presented to NMM session 115, NMM session 115 indexes data base 500 using the key in order to determine which network to use for transmission of the message. This is accomplished by applying the set of attribute 310 values of the message in question to the logic function within field

506 of each data base 500 record as indexed by the key. When the outcome of such an application is true, the network ID list within field 505 of the evaluated record is written to Null field 308 of the header of the message in question.

Figure 6:
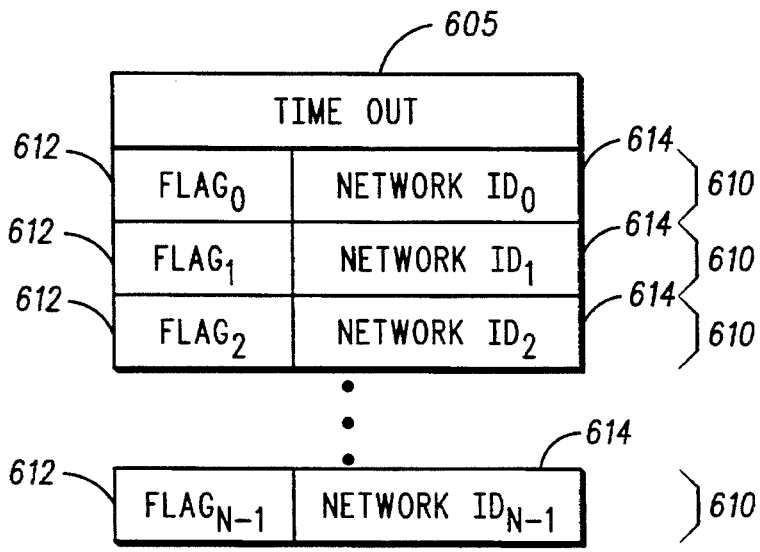
FIG. 6 depicts the structure of a network ID list as shown in FIG. 5.

FIG. 6 depicts the structure of a single network ID list 505 as shown in FIG. 5. Each list 505 comprises a time out information field 605 and a plurality of entries 610 numbered 0 to N-1, where N is the maximum number of entries in the list. Each entry 610 comprises a flag field 612 and a network identifier field 614.

The time out information within field 605 is used by CM 111 of FIG. 2 in order to determine how long a particular network, as identified by a network identifier field 614, will be queried prior to default to a next entry 610 (i.e., network) in the list.

Each flag field 612 comprises a bit map, wherein each bit controls various aspects of CM 111 operation. Such operations include, but are not limited to, transmission of an entire message 300, transmission of a partial message 300, transmission of a notification that a message 300 is queued at server 110 and the like. Network identifier field 614 contains information which uniquely identifies a particular communication network that mat be available for transmission of a message 300.

In accordance with the present invention, each network ID list 505 is organized such that the most favored network appears in the first network identifier field (e.g., Network Identifier 0). In this fashion the most favored network is always tried first, prior to attempting to transmit a message over a lower priority or less desirable network.

FIGS. 7a–7h depict data structures which describe logic functions as stored within data base 400 and 500 of FIGS. 4 and 5. These logic functions further describe conditions which permit server 110 to determine which device and/or network are to be used for message routing in accordance with the present invention. In accordance with the preferred embodiment, the logic functions depicted in FIGS. 7a– 7h employ Boolean algebra. It will nonetheless be appreciated by those skilled in the art that other forms of logic, such as, but not limited to Fuzzy logic, may also be employed by the logic functions discussed herein.

Figure 7A:
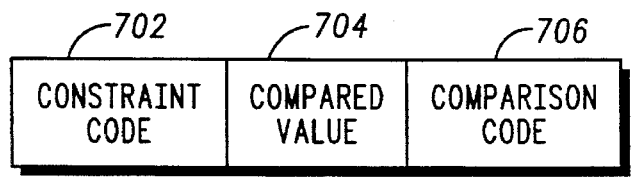
FIGS. 7a–7h depict data structures which describe various logic functions as anticipated for use by data base 400 and 500 of FIGS. 4 and 5.
Figure 7B:
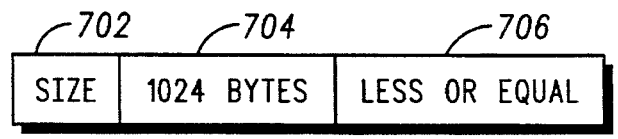

FIGS. 7a and 7b are graphical representations of a logic function 700 for describing the size, the priority or the security requirements for a particular message 300. The logic function 700 of FIG. 7a comprises a constraint code 702, a comparend value 704 and a comparison code 706.

By way of example, and not by way of limitation, let us assume that in the communication system of FIG. 1, devices 122 and 124 are operated by a single individual. Let us further assume that device 122 is a personal computer maintained at the individual's office, while device 124 is a personal digital assistant that the individual carries personally. Let us further assume that it is desirable to receive small messages at device 124 while larger messages are to be sent to device 122.

FIG. 7b is a graphical representation of a logic function 700 that delimits messages based upon size. In accordance with this example, constraint code field 702 is set to SIZE, thereby providing an indication of the delimit function to be performed. Comparend value 704 is set to, for example, 1024 bytes or 1K byte. Finally comparison code field 706 is set to LESSOREQUAL, which corresponds to less than or equal to. In accordance, the logic function 700 of FIG. 7b asks the question whether the received message is less than or equal to 1K byte of information.

This logic function is representative of the type of information that may be stored in a data base 400 or 500 entry within logic function fields 406 or 506 of FIGS. 4 or 5. To assist in generating other logic functions, comparison code field 706 may also be set to LESS for less than, EQUAL for equal to, GREATER for greater than, GREATER-OREQUAL for greater than or equal to and NOTEQUAL for not equal.

As previously mentioned, this same construction is used to delimit the transmitted size, the priority and the security of a particular message. In accordance, other constraint codes, such as, for example, XSIZE for transmitted size, PRIORITY for message priority and SECURITY for message security are used by the present invention in association with constraint code field 702.

Figure 7C:
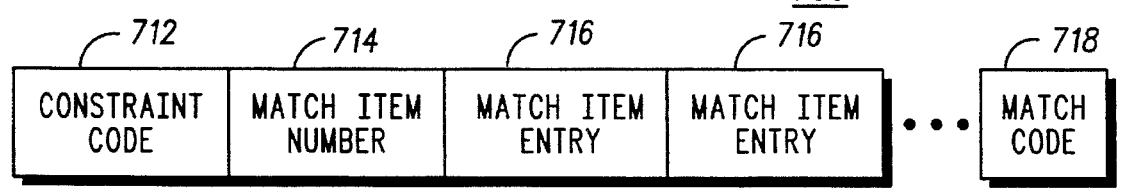
Figure 7D:
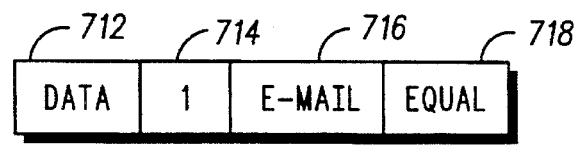

FIGS. 7c and 7d are graphical representations of a logic function 710 for testing the data format of a message. Logic function 710 comprises a constraint code field 712, match item number field 714, match item entries 716, number 1-N and a match code 718.

Referring back to FIG. 1, let us remember that devices 122 and 124 are operated by a single individual; that device 122 is a personal computer maintained at the individual's office; and that device 124 is a personal digital assistant that the individual carries personally. Let us assume that it is desirable to receive E-Mail at device 124 while all other messages are to be sent to device 122.

FIG. 7d is a graphical representation of a logic function 710 that delimits messages based upon their content. In accordance with this example, constraint code field 712 is set to DATA, thereby providing an indication the delimit function to be performed. Match item number field 714 is set to 1 because only one data format type is being delimited. Were we delimiting both E-Mail messages and spreadsheets messages, then field 714 would contain the numeral 2.

Match item field 718 contains the data format being tested; namely E-Mail. Were we delimiting both E-Mail messages and spreadsheet messages, match item field 718 would contains two entries; namely E-Mail and Spreadsheet.

Finally match code field 718 is set to EQUAL. In accordance, the logic function 710 of FIG. 7d asks the question whether the received message is an E-Mail message. This logic function represent the type information that may be stored in a data base 400 or 500 entry within logic function fields 406 or 506 of FIGS. 4 or 5. To assist in generating other logic functions, other match items such as, but not limited to: ASCII Text, FORMATTED Text, VOICEMAIL, VOICECIRCUIT, FACSIMILE, VIDEO, and/or GRAPHICS can be specified such that any set of data formats in the message body can be tested against a set of specified data formats. The testing will look for proper SUBSET, SUPERSET, IMPROPERSUBSET, IMPROPERSUPERSET, NOTEQUAL (inequality), INTERSECT (intersection) and DISJOINT as specified in match code field 718.

Figure 7E:
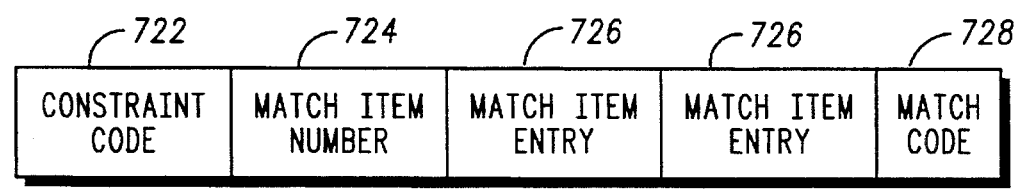
Figure 7F:
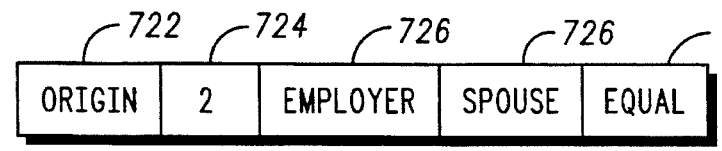

FIGS. 7e and 7f are graphical representations of a logic function 720 for testing the origin of a message. The logic function 720 comprises a constraint code 722, match item number field 724, match item entries 726, number 1-N and a match code field 728.

Referring again to FIG. 1, let us remember that devices 122 and 124 are operated by a single individual; that device 122 is a personal computer maintained at the individual's office; and that device 124 is a PDA that the individual carries personally. Let us assume that it is desirable to receive messages from the individual's spouse and employer, at device 124 while all other messages are to be sent to device 122.

FIG. 7f is a graphical representation of a LOGIC function 720 that delimits messages based upon their origin. In accordance with this example, constraint code field 722 is set to ORIGIN, thereby providing an indication the delimit function to be performed. Match item number field 724 is set to 2 because we are delimiting messages from two sources. In accordance, match item field 726 contains two entries; namely SPOUSE and EMPLOYER, which are identifier's for the individuals spouse and employer, respectively. Finally match code field 728 is set to EQUAL. In accordance, the logic function 720 of FIG. 7F asks the question whether the received message is from the individual's spouse or employer.

Figure 7G:
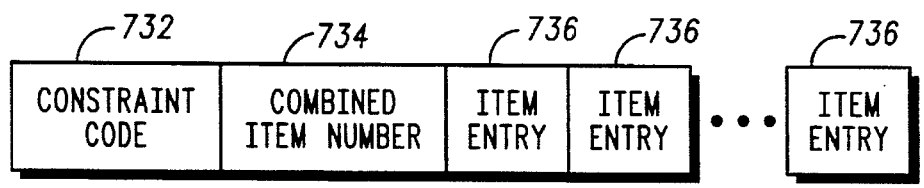
Figure 7H:
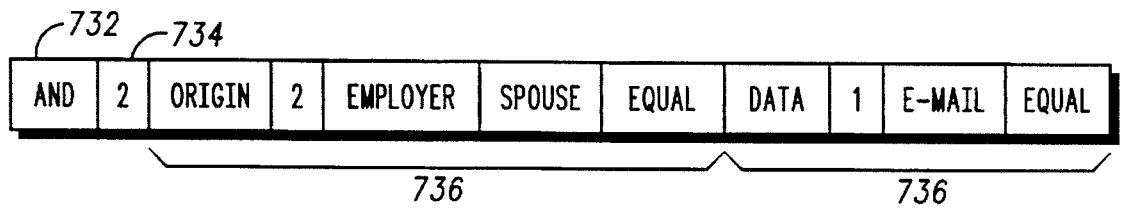

FIGS. 7g and 7h are graphical representations of a logic function 730 for logically combining those functions described herein above. The logic function 730 comprises a constraint code 732, combined item number field 734, and item entries 736 number 1-N.

Referring again to FIG. 1, let us remember that devices 122 and 124 are operated by a single individual; that device 122 is a personal computer maintained at the individual's office; and that device 124 is a PDA that the individual carries personally. Let us assume that it is desirable to receive E-Mail messages from the individual's spouse and employer, at device 124 while all other messages are to be sent to device 122.

FIG. 7h is a graphical representation of a logic function 730 that logically combines logic functions 700, 710 and 720 as described herein above. In accordance with this example, constraint code field 732 is set to AND, thereby providing an indication the logical function to be performed. Combined item number field 734 is set to 2 because two logic expressions are being combined. Finally, the two respective logic functions are entered in item entries 736. In accordance, the logic function of FIG. 7h asks the question whether the received message is an E-Mail message from either the individual's spouse or the individual's employer.

Other logic expressions can be generated by entering logical operations including AND, OR, NAND and NOR in constraint code field 432. Moreover, the expressions entered in item field 436 may themselves comprise compound logic functions like the one described in association with FIG. 7g.

As is necessary and from time to time, subscriber's will transmit messages to mobility managers DMM 113 and NMM 115 within server 110 and locally within the individual's subscriber device, requesting the alteration of the mobility preferences; i.e., the records within data bases 400 and 500. By changing the mobility preferences, including the logic functions of fields 406 and 506, the subscriber can effectively change the device and network selection performed by DMM 133 and NMM 115 as described herein below.

Figure 8:
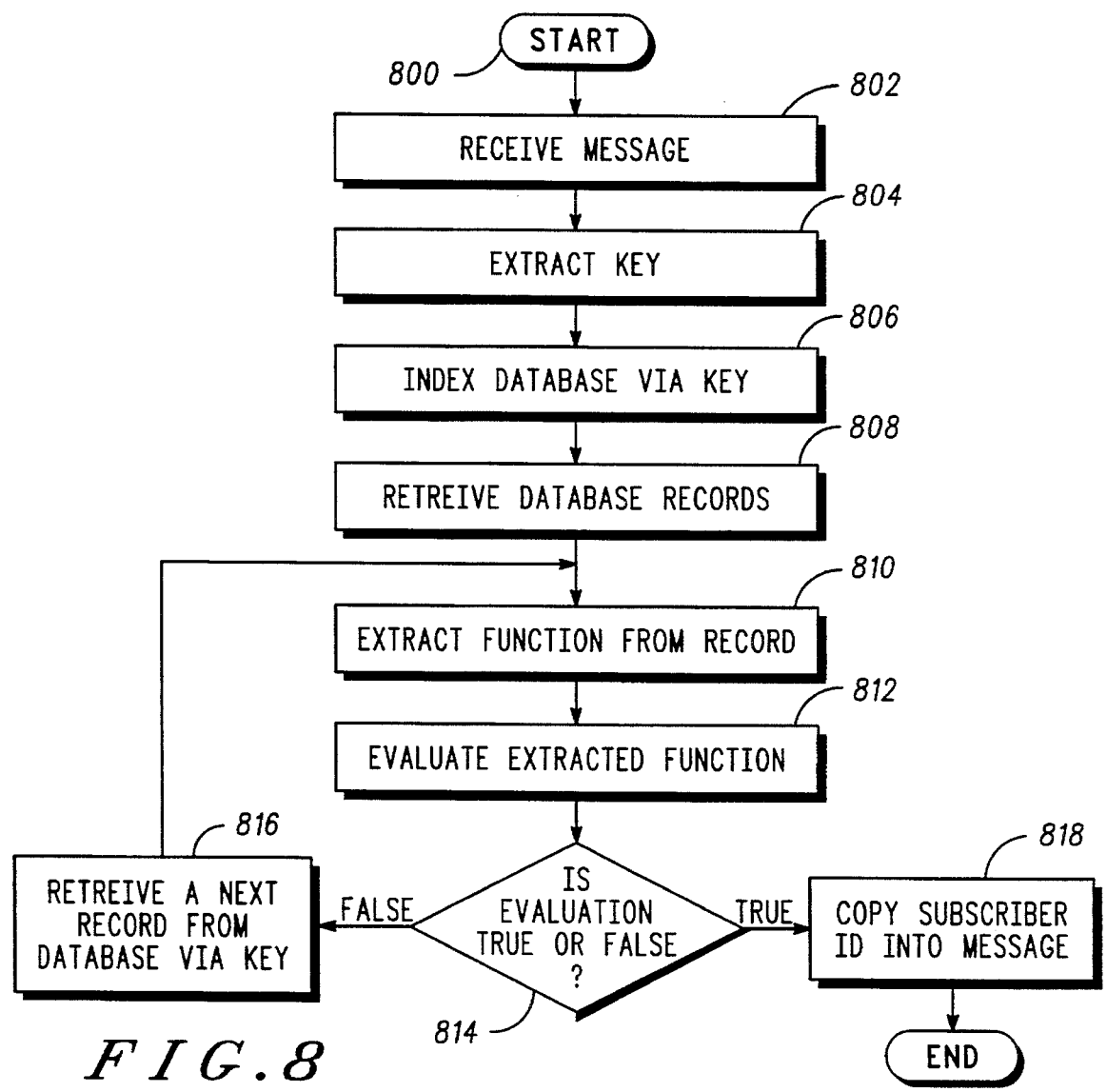
FIG. 8 is a flow chart diagram illustrating the steps performed by the server of FIG. 1 in order to route information to a particular destination device in accordance with the present invention.

FIG. 8 is a flow chart diagram illustrating the steps performed by server 100 of FIG. 1 in order to route information to a particular destination device in accordance with the present invention. Commencing at start block 800 flow proceeds to block 802 upon receipt of a message 300 by CM 111 of server 110. CM 111 passes the received message on to DMM 113 and at block 804 DMM 113 extracts a key from the message 300. For the purpose of DMM 113, the key comprises subscriber ID field 304 of FIG. 3. At block 806, DMM 113 indexes database 400 of FIG. 4 via the extracted key in order to retrieve a first record (e.g., an entry in field 402, 404, and 406) from said database whose subscriber ID field 402 matches the extracted key.

Proceeding to block 808 all records indexed via the key are retrieved. Thereafter, at blocks 810 through 814 the logic function 406 is extracted from the first data base record and evaluated. In this effort, the attributes 310 values of the received message 300 are applied to the logic function of the retrieved record at block 812 by DMM 113. Then, at block 814 a check is performed by DMM 113 to determine whether the logic function, when evaluated using the message attribute value is true or false.

If false, flow proceeds to block 816 where a next data base record is indexed via the key of step 804 in order to retrieve yet another data base record. From block 816, flow branches back to blocks 810 through 814 where the next retrieved logic function is evaluated to determine whether it is true or false. This process continues until all matching database records have been retrieved and evaluated per steps 810–816 or a true condition is meet at step 814.

Assuming a true condition is encountered at step 814, flow proceeds to block 818, where the Device ID stored in field 404 of the retrieved record is copied, i.e., written by DMM 113 into Null field 306 of the message 300. As a final step DMM 113 passes the message 300 to NMM 115 for further processing.

Figure 9:
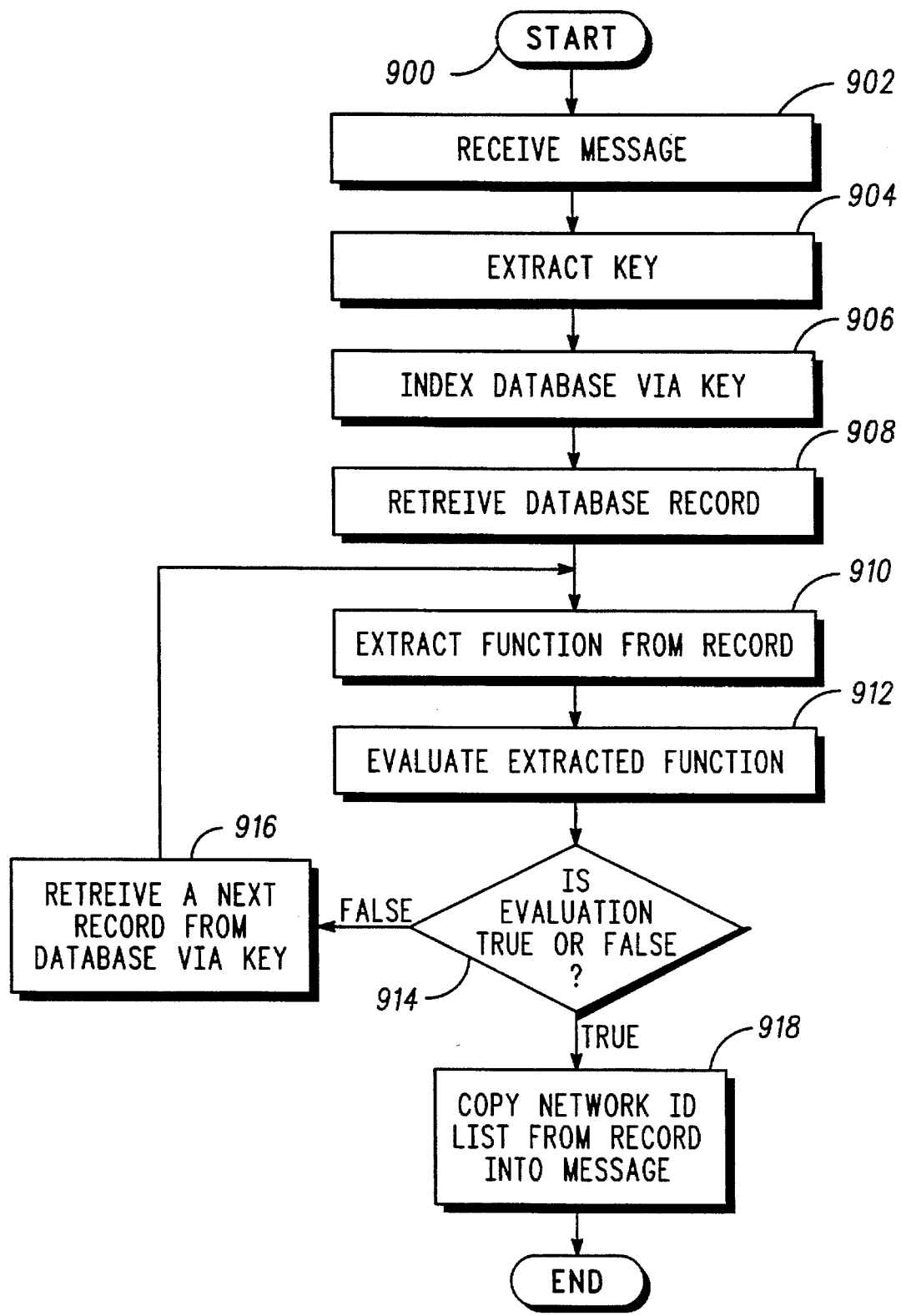
FIG. 9 is a flow chart diagram illustrating the steps performed by either the server or a subscriber device of FIG. 1 in order to route information over a particular communication network in accordance with the present invention.

FIG. 9 is a flow chart diagram illustrating the steps performed by either server 110 or a subscriber of FIG. 1 in order to route information over a particular communication network in accordance with the present invention.

Commencing at start block 900 flow proceeds to block 902 upon receipt of a message 300 by NMM 115 of server 110 or subscriber device 120–124 of FIG. 1. As previously mentioned NMM 115 receives the message from DMM 113 and at block 904 NMM 115 extracts a key from the message 300. For the purpose of NMM 115, the key comprises subscriber ID field 304 and Null field 306 of FIG. 3. Where NMM 115 is employed within server 110 of FIG. 1, DMM 113 will fill Null field 306 of FIG. 3 with a value corresponding to the selected destination device. When NMM 115 is employed within a subscriber device 120–124 of FIG. 1, Null field 306 has a default value corresponding to server 110 of FIG. 1.

At block 906, NMM 115 indexes database 500 of FIG. 5 via the extracted key in order to retrieve a first record from said database at block 908 whose subscriber ID field 502 and device ID field 504 matches the extracted key.

Proceeding to block 908 all records indexed via the key are retrieved. Thereafter, at blocks 910 through 914 the logic function 506 is extracted from the first database record and evaluated. In this effort, the attribute 310 values of the received message 300 are applied to the logic function of the retrieved record at block 912 by NMM 115. At block 914 a check is performed by NMM 115 to determine whether the logic function is true or false when evaluated using the set of message attribute values.

If false, flow proceeds to block 916 where a next data base record is indexed via the key of step 904 in order to retrieve yet another data base record. From block 916, flow branches back to blocks 910 through 914 where the next retrieved logic function is evaluated. This process continues until all matching database records have been retrieved and evaluated per steps 910–916 or a true condition is meet at step 914.

Assuming a true condition is encountered at step 914, flow proceeds to block 918, where the network ID list stored in field 505 of the retrieved record is written by NMM 115 into Null field 308 of the message 300.

As a final step, and in accordance with the discussion of FIG. 6, NMM 115 passes the message 300 to CM 111 for delivery to the device specified in field 306 of the message and via one of the available networks listed in the network ID list in field 308 of the message 300.

It will be appreciated by those skilled in the art that other modifications can be made to the invention disclosed herein without departing from the spirit thereof. For example, a subscriber can utilize a predefined set of communication preferences, hereinafter referred to as a setting, for frequently encountered mobility situations. A setting may comprise a collection of communication preferences, stored as a named file or a document by a file or management document system as is known in the art. A subscriber could create a plurality of such settings, each containing the necessary data base records 410 and/or 510 to cause information to be routed in accordance with the subscriber's wishes. For example, settings can be developed to handle information routing specific to when the subscriber is in her office, in a meeting, driving to and from work, at home and so on. Thereafter, the subscriber simply transmits the appropriate settings to DMM 113 and NMM 115 that corresponds to her preference. These setting will then be stored by DMM 113 and NMM 115 in respective data bases 400 and 500 for use in accordance with the present invention and as described herein above.

What is claimed is:

1. In a communication system, a method for routing information comprising the steps of:

receiving a message having a key and a first set of message attributes, each attribute having a value;

extracting the key from the message;

indexing a data base via the extracted key to retrieve one or more records, each record containing a representation of a logic function that describes a second set of message attributes;

applying the first set of message attribute values to the logic function of a first retrieved record;

determining whether the logic function is true or false;
   if true,
   selecting that data base record for use in routing the information;
   else,
   applying the first set of message attribute values to the logic function of a next retrieved data base record.

2. The method of claim 1 wherein the key comprises a subscriber identifier.

3. The method of claim 2 wherein the key further comprises a destination device identifier.

4. The method of claim 1 wherein the first set of message attributes are selected from the group consisting of: message originator, message priority, message security, message format, message logical size, message transmitted size, and message compressed size.

5. The method of claim 1 wherein a data base record comprises:

the key, and a destination device identifier.

6. The method of claim 1 wherein a data base record comprises:

the key, and a list of communication network identifiers.

7. The method of claim 6 further comprising the step of ordering the list of communication network identifiers in an order of preference.

8. The method of claim 1 wherein the step of selecting that data base record further comprises the step of routing the information to a destination device as identified in the selected data base record.

9. The method of claim 1 wherein the step of selecting the data base record further comprises the step of extracting a list of communication network identifiers from the selected record for use in routing the message.

10. The method of claim 1 wherein each data base record contains a logic function that describes a unique set of message attributes.

11. The method of claim 1 further comprising the step of applying the first set of message attribute values to the logic function of each retrieved data base record until a true condition is encountered.

12. The method of claim 8 wherein the routed information comprises at least one of voice and data.

13. The method of claim 1 wherein the logic function that describes the second set of message attributes employs logic selected from the group consisting of:

Boolean algebra; and fuzzy logic.

14. In a communication system, a method for routing information to one of a plurality of destination devices comprising the steps of:

receiving a message having a key and a first set of message attributes, each attribute having a value;

extracting the key from the message;

indexing a data base via the extracted key to retrieve one or more records, each record containing a destination device identifier and a representation of a logic function that describes a second set of message attributes;

applying the first set of message attribute values to the logic function of a first retrieved record;

determining whether the logic function is true or false;
   if true,
   selecting the destination device identifier within that record for use in routing the information;
   else,
   applying the first set of message attribute values to the logic function of each next retrieved data base record until a true condition is encountered.

15. The method of claim 14 wherein the key comprises a subscriber identifier.

16. The method of claim 14 wherein the first set of message attributes are selected from the group consisting of: message originator, message priority, message security, message format, message logical size, message transmitted size, and message compressed size.

17. The method of claim 14 wherein a data base record comprises:

the key, and a destination device identifier.

18. The method of claim 14 wherein the step of selecting that data base record further comprises the step of routing the information to a destination device as identified in the selected data base record.

19. The method of claim 18 wherein the routed information comprises at least one of voice and data.

20. A method for routing information over one of a plurality of communication networks within a communication system, said method comprising the steps of:

receiving a message having a key and a first set of message attributes, each attribute having a value;

extracting the key from the message;

indexing a data base via the extracted key to retrieve a plurality of records, each record containing a representation of a logic function that describes a second set of message attributes and a prioritized list of communication network identifiers;

applying the first set of message attribute values to the logic function of a first retrieved data base record;

determining whether the logic function is true or false; if true, selecting the list of communication network identifiers within that record for use in routing the information;

else, applying the first set of message attribute values to the logic function of each next retrieved data base record until a true condition is encountered.

21. The method of claim 20 wherein the key comprises a subscriber identifier and a destination device identifier.

22. The method of claim 20 wherein the first set of message attributes are selected from the group consisting of: message originator, message priority, message security, message format, message logical size, message transmitted size, and message compressed size.

23. The method of claim 20 wherein a data base record further comprises the key.

24. The method of claim 20 wherein the prioritized list of communication network identifiers is ordered according to preference.

25. The method of claim 20 wherein the step of selecting the data base record further comprises the step of extracting the list of communication network identifiers from the selected record for use in routing the information.

26. The method of claim 25 wherein the information comprises at least one of voice and data.

27. An apparatus for routing information to a subscriber within a communication system based upon various message attributes and comprising:

a receiver for receiving a message having a key and a first set of message attributes, each attribute having a value;

memory, coupled to the receiver, for storing a data base of records, each record containing a key and a representation of a logic function that describes a second set of message attributes; and a processor, coupled to the receiver and memory, for extracting the key and the first set of message attribute values from the message, indexing memory via the extracted key to retrieve those data base records having the same key and applying the first set of message attribute values to the logic function of a first retrieved record to determine whether the logic function is true or false; if true, said processor selecting that data base record for use in routing the information, else, said processor applying the first set of message attribute values to the logic function of each retrieved database record until a true condition is encountered.

28. The apparatus of claim 27 wherein the logic function that describes the second set of message attributes employs logic selected from the group consisting of:

Boolean algebra; and fuzzy logic.

29. The apparatus of claim 27 wherein the routed information comprises at least one of voice and data.

* * * * *